United States Patent
Davydov et al.

(10) Patent No.: US 11,166,331 B2
(45) Date of Patent: *Nov. 2, 2021

(54) APPARATUS CONFIGURED TO REPORT APERIODIC CHANNEL STATE INFORMATION FOR DUAL CONNECTIVITY

(71) Applicant: Intel Corporation, Santa Clara, CA (US)

(72) Inventors: Alexei Davydov, Nizhny Novgorod (RU); Youn Hyoung Heo, Seoul (KR); Hong He, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,304

(22) Filed: Nov. 22, 2019

(65) Prior Publication Data

US 2020/0163143 A1 May 21, 2020

Related U.S. Application Data

(63) Continuation of application No. 15/670,311, filed on Aug. 7, 2017, now Pat. No. 10,506,652, which is a (Continued)

(51) Int. Cl.
*H04W 76/15* (2018.01)
*H04L 1/00* (2006.01)
(Continued)

(52) U.S. Cl.
CPC ........... *H04W 76/15* (2018.02); *H04L 1/0026* (2013.01); *H04L 1/0029* (2013.01); *H04W 24/10* (2013.01); *H04B 7/0626* (2013.01); *H04W 16/32* (2013.01)

(58) Field of Classification Search
CPC ..... H04W 76/15; H04W 16/32; H04W 24/10; H04L 1/0026; H04L 1/0029; H04B 7/0626
See application file for complete search history.

(56) References Cited

U.S. PATENT DOCUMENTS 9,730,258 B2 8/2017 Davydov et al.
10,506,652 B2 12/2019 Davydov et al.
(Continued)

FOREIGN PATENT DOCUMENTS

CN 104081827 A 10/2014
CN 107079513 A 8/2017
(Continued)

OTHER PUBLICATIONS

"Korean Application Serial No. 10-2017-7013327, Voluntary Amendment filed Oct. 15, 2020", w current English claims, It doesn't look like claims were amended in vol amendment filed, 15 pgs.
(Continued)

*Primary Examiner* — Jianye Wu
(74) *Attorney, Agent, or Firm* — Schwegman Lundberg & Woessner, P.A.

(57) ABSTRACT

Embodiments of a system and method for reporting channel state information (CSI) in a wireless network are generally described herein. In some embodiments, an apparatus of a User Equipment (UE) can include physical layer circuitry to receive, in a first subframe, a first aperiodic CSI request from a first cell group, and a second aperiodic CSI request from a second cell group. The UE can include processing circuitry to determine a number of requested CSI processes corresponding to the first aperiodic CSI request and the second aperiodic CSI request. Additionally, the processing circuitry can select a subset of the requested CSI processes when the determined number of requested CSI processes is more than
(Continued)

five. Furthermore, the processing circuitry can calculate CSI for the selected CSI processes.

20 Claims, 8 Drawing Sheets

Related U.S. Application Data continuation of application No. 14/741,233, filed on Jun. 16, 2015, now Pat. No. 9,730,258.

(60) Provisional application No. 62/084,997, filed on Nov. 26, 2014, provisional application No. 62/081,281, filed on Nov. 18, 2014.

(51) Int. Cl.
*H04W 24/10* (2009.01)
*H04B 7/06* (2006.01)
*H04W 16/32* (2009.01)

(56) References Cited

U.S. PATENT DOCUMENTS

| | | | |
|---|---|---|---|
| 2013/0195045 A1 | 8/2013 | Papasakellariou et al. | |
| 2013/0235756 A1 | 9/2013 | Seo et al. | |
| 2014/0010126 A1 | 1/2014 | Sayana et al. | |
| 2014/0044076 A1* | 2/2014 | Etemad | H04W 36/0088 370/329 |
| 2014/0086174 A1* | 3/2014 | Nam | H04L 1/0026 370/329 |
| 2015/0327284 A1 | 11/2015 | Wakabayashi | |
| 2016/0142191 A1 | 5/2016 | Davydov et al. | |
| 2017/0041059 A1* | 2/2017 | Yi | H04B 7/0456 |
| 2018/0092149 A1 | 3/2018 | Davydov et al. | |

FOREIGN PATENT DOCUMENTS

| | | |
|---|---|---|
| CN | 108463007 A | 8/2018 |
| CN | 107079513 | 6/2020 |
| EP | 3222079 A1 | 9/2017 |
| JP | 2015522222 A | 8/2015 |
| TW | 200828893 A | 7/2008 |
| TW | 201203916 A1 | 1/2012 |
| TW | 201335275 A1 | 9/2013 |
| TW | 201440452 A | 10/2014 |
| TW | 201624947 A | 7/2016 |
| TW | I602405 B | 10/2017 |
| WO | WO-2014007599 A1 | 1/2014 |
| WO | WO-2016081109 A1 | 5/2016 |

OTHER PUBLICATIONS

U.S. Appl. No. 14/741,233, U.S. Pat. No. 9,730,258, filed Jun. 16, 2015, Apparatus Configured to Report Aperiodic Channel State Information for Dual Connectivity.
U.S. Appl. No. 15/670,311, U.S. Pat. No. 10,506,652, filed Aug. 7, 2017, Apparatus Configured to Report Aperiodic Channel State Information for Dual Connectivity.
"U.S. Appl. No. 14/741,233, Non Final Office Action dated Nov. 17, 2016", 8 pgs.
"U.S. Appl. No. 14/741,233, Notice of Allowance dated Mar. 28, 2017", 8 pgs.
"U.S. Appl. No. 14/741,230, Response filed Feb. 17, 2017 to Non Final Office Action dated Nov. 17, 2016", 9 pgs.
"U.S. Appl. No. 15/670,311, Advisory Action dated Jul. 1, 2019", 4 pgs.
"U.S. Appl. No. 15/670,311, Final Office Action dated Apr. 30, 2019", 11 pgs.
"U.S. Appl. No. 15/670,311, Non Final Office Action dated Jan. 18, 2019", 13 pgs.
"U.S. Appl. No. 15/670,311, Notice of Allowance dated Aug. 14, 2019", 5 pgs.
"U.S. Appl. No. 15/670,311, Preliminary Amendment filed Dec. 13, 2017", 8 pgs.
"U.S. Appl. No. 15/670,311, Response filed Mar. 26, 2019 to Non Final Office Action dated Jan. 18, 2019", 12 pgs.
"U.S. Appl. No. 15/670,311, Response filed Jun. 18, 2019 to Final Office Action dated Apr. 30, 2019", 11 pgs.
"U.S. Appl. No. 15/670,311, Response filed Jul. 25, 2019 to Advisory Action dated Jul. 1, 2019", 11 pgs.
"Chinese Application Serial No. 201580056191.6, Office Action dated Aug. 15, 2019", w/ English summary from agent's letter, 8 pgs.
"Chinese Application Serial No. 201580056191.6, Response filed Dec. 30, 2019 to Office Action dated Aug. 15, 2019", w/ English claims, 19 pgs.
"Chinese Application Serial No. 201580056191.6, Voluntary Amendment filed Dec. 14, 2017", w/ claims in English, 20 pgs.
"Correction to aperiodic CSI reporting with one configured CSI process", R1-130628, 3GPP TSG RAN WG1 Meeting #72, (Jan. 19, 2013).
"European Application Serial No. 15861006.3, Communication Pursuant to Article 94(3) EPC Apr. 2, 2019", 5 pgs.
"European Application Serial No. 15861006.3, Extended European Search Report dated Jul. 23, 2018", 11 pgs.
"European Application Serial No. 15861006.3, Response filed Jan. 10, 2018 to Communication Pursuant to Rules 161 and 162 EPC dated Aug. 1, 2017", 15 pgs.
"European Application Serial No. 15861006.3, Response filed Feb. 11, 2019 to Extended European Search Report dated Jul. 23, 2018", 13 pgs.
"European Application Serial No. 15861006.3, Response filed Oct. 9, 2019 to Communication Pursuant to Article 94(3) EPC Apr. 2, 2019", 11 pgs.
"International Application Serial No. PCT/US2015/055901, International Search Report dated Jan. 27, 2016", 3 pgs.
"International Application Serial No. PCT/US2015/055901, Written Opinion dated Jan. 27, 2016", 6 pgs.
"Japanese Application Serial No. 2017-523462, Notification of Reasons for Rejection dated May 29, 2018", W/ English Translation, 5 pgs.
"Japanese Application Serial No. 2017-523462, Response filed Aug. 29, 2018 to Notification of Reasons for Rejection dated May 29, 2018", w/ English claims, 16 pgs.
"Japanese Application Serial No. 2017523462, Voluntary Amendment filed Feb. 6, 2018", w/ claims in English, 15 pgs.
"Korean Application Serial No. 10-2017-7013327, Voluntary Amendment filed Jan. 16, 2018", w/ claims in English, 21 pgs.
"Korean Application Serial No. 1020177013327, Voluntary Amendment filed Jun. 19, 2017", w/ claims in English, 8 pgs.
"Physical layer functionalities for Dual Connectivity", 3GPP Draft; RI-140259—Physical Layer Functionalities for Dual Connectivity, 3rd Generation Partnership Project (3GPP), Mobile Competence Centre ; 650, Route Des Lucioles ; F-06921 Sophia-Antipolis C, vol. RAN WG1, No. Prague, Czech Republic, [Online] Retrieved from the internet: <http://www.3gpp.org/ftp/Meetings_3GPP_SYNC/RAN/RANI/Docs/>, (Feb. 9, 2014), 5 pgs.
"Remaining physical layer aspects of dual Connectivity", 3GPP Draft; RI-143767, 3rd Generation Partnership Project (3GPP), Mobile Competence Centre ; 650, Route Des Lucioles ; F-06921 Sophia-Antipolis Cedex; France, vol. RAN WG1, No. jubljana, Slovenia, [Online] Retrieved from the internet: <http://www.3gpp.org/ftp/tsg ran/WGI RLI/TSGRI_78b/Docs/>, (Sep. 27, 2014), 4 pgs.
"Taiwanese Application Serial No. 104132863, Office Action dated Oct. 20, 2016", with machine translation, 10 pgs.
"Taiwanese Application Serial No. 104132863, Response filed Apr. 21, 2017 to Office Action dated Oct. 20, 2016", w/ claims in English, 70 pgs.
Ericsson, et al., "Aperiodic CSI report for secondary cell or different processes", R1-130544, 3GPP TSG RAN WG1 Meeting #72, (Jan. 18, 2013), 3 pgs.
Ericsson, "Inter-node RRC messages for dual connectivity", connectivity,3GPP TSG-RAN WG2 Meeting #86 R2-142405, [Online]

(56) References Cited

OTHER PUBLICATIONS

Retrieved from the internet: <http://www.3gpp.org/ftp/tsg_ran/WG2_RL2/TSGR2_86/Docs/R2-142405.zip>, (May 9, 2014), 8 pgs.

Huawei, "Discussion on aperiodic CSI processing in Rel-11 CoMP", 3GPP TSG-RAN WG1 Meeting #76 R1-140517, [Online] Retrieved from the internet: <http://www.3gpp.org/ftp/tsg_ran/WG1_RL1/Docs/R1-140517.zip>, (Feb. 1, 2014), 5 pgs.

LG Electronics, "Discussions on dual connectivity remaining issues for physical layer aspects", 3GPP TSG-RAN WG1 Meeting #79 R1-144876, [Online] Retrieved from the internet: <http://www.3gpp.org/ftp/tsg_ran/WG1_RL1/TSGR1_79/Docs/R1-144876.zip>, (Nov. 8, 2014), 7 pgs.

LG Electronics, "Remaining RAN1 issues on dual connectivity", 3GPP TSG-RAN WG1 Meeting #78 R1-143174, [Online] Retrieved from the internet: http://www.3gpp.org/ftp/tsg_ran/WG1_RL1/TSGR1_78/Docs/R1-143174.zip, (Aug. 10, 2014), 7 pgs.

Yi, et al., "Dual Connectivity With CoMP Operation", U.S. Appl. No. 61/980,531, (Apr. 16, 2014), 4 pgs.

"Chinese Application Serial No. 201810135088.6, Response filed May 28, 2021 to Office Action dated Jan. 27, 2021", With English claims, 19 pages.

\* cited by examiner

APPARATUS CONFIGURED TO REPORT APERIODIC CHANNEL STATE INFORMATION FOR DUAL CONNECTIVITY

PRIORITY CLAIM

This application is a continuation of U.S. patent application Ser. No. 15/670,311, filed Aug. 7, 2017, now issued as U.S. Pat. No. 10,506,652, which is a continuation of U.S. patent application Ser. No. 14/741,233, filed Jun. 16, 2015, now issued as U.S. Pat. No. 9,730,258, which claims priority under 35 U.S.C. 119(e) to U.S. Provisional Patent Application Ser. No. 62/084,997, filed Nov. 26, 2014, and U.S. Provisional Patent Application Ser. No. 62/081,281, filed Nov. 18, 2014, each of which are incorporated herein by reference in their entireties.

TECHNICAL FIELD

Embodiments pertain to radio access networks. Some embodiments relate to aperiodic channel state information (CSI) processing and reporting in cellular networks, such as Long Term Evolution (LTE) and LTE advanced (LTE-A) networks.

BACKGROUND

Current issues with communicating data over a wireless network can include low throughput, frequent handovers, handover failures, inefficient offloads, and service interruptions.

Dual connectivity in an LTE network can significantly improve per-user throughput, reduce handovers, and reduce handover failures by allowing a user to be connected simultaneously to a primary cell group and a secondary cell group via a macro evolved Node B (eNB) and a small cell eNB.

With regards to low throughput, dual connectivity can increase per-user throughput by aggregating radio resources from at least two eNBs. Additionally, throughput can be increased by transmitting or receiving multiple streams and dynamically adapting to the best radio conditions of multiple cells. Also, small cell eNBs can provide additional capacity for user equipments (UEs) having multiple radio connections.

Moreover, moving UEs suffer frequent handover failure, inefficient offload, and service interruption. The consequences are more severe if the UE's velocity is higher and cell coverage is smaller. Dual connectivity can reduce the handover failure rate by maintaining the macro eNB (e.g., primary cell) connection as the coverage layer. Dual connectivity also helps in load balancing between the macro eNB and the small cell eNB (e.g., secondary cell).

Furthermore, dual connectivity can reduce signaling overhead towards the core network due to frequent handover. For example, signaling overhead can be reduced by not issuing handover operations as long as the UE is within macro coverage.

However, dual connectivity can impose several technical challenges.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In this disclosure, embodiments are often discussed with reference to macro eNBs and small cell eNBs. A small cell eNB can be a pico eNB. Additionally, various embodiments disclosed herein are applicable in other settings with other terminology. For example, a macro eNB can be denoted as an "anchor eNB" or a "primary eNB," while a small cell eNB can be denoted as an "assisting eNB" or a "secondary eNB."

Figure 1:
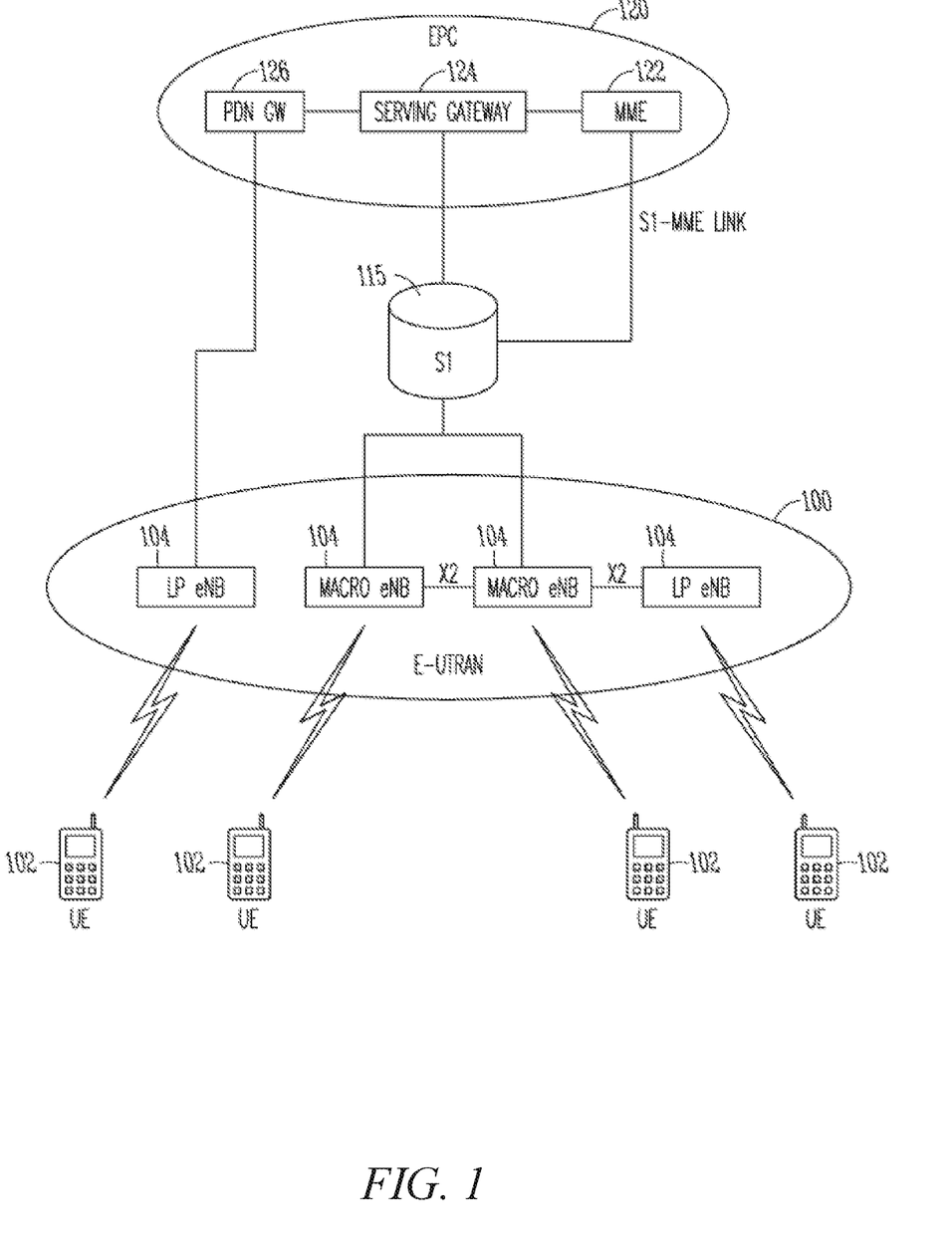
FIG. 1 is a functional diagram of a 3rd Generation Partnership Project (3GPP) network, in accordance with some embodiments.

FIG. 1 is a functional diagram of a 3GPP network, in accordance with some embodiments. The network comprises a radio access network (RAN) (e.g., as depicted, the E-UTRAN or evolved universal terrestrial radio access network) 100 and a core network 120 (e.g., shown as an evolved packet core (EPC)) coupled together through an S1 interface 115. For the sake of convenience and brevity, only a portion of the core network 120, as well as the RAN 100, is shown.

The core network 120 includes a mobility management entity (MME) 122, a serving gateway (serving GW) 124, and a packet data network gateway (PDN GW) 126. The RAN 100 includes Evolved Node-Bs (eNBs) 104 (which can operate as base stations) for communicating with User Equipments (UEs) 102. The eNBs 104 can include macro eNBs and low power (LP) eNBs, such as micro eNBs.

The MME 122 is similar in function to the control plane of legacy Serving GPRS Support Nodes (SGSN). The MME 122 manages mobility aspects in access, such as gateway selection and tracking area list management. The serving GW 124 terminates the interface toward the RAN 100, and routes data packets between the RAN 100 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward a packet data network (PDN). The PDN GW 126 routes data packets between the core network 120 and the external PDN, and may be a key node for policy enforcement and charging data collection. It can also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separate physical nodes.

The eNBs 104 (macro and micro) terminate the air interface protocol and may be the first point of contact for a UE 102. In some embodiments, an eNB 104 can fulfill various logical functions for the RAN 100, including but not limited to RNC (radio network controller) functions such as radio bearer management, uplink and downlink dynamic radio resource management and data packet scheduling, and mobility management. In accordance with embodiments, the UEs 102 may be configured to communicate orthogonal frequency-division multiplexing (OFDM) communication signals with an eNB 104 over a multicarrier communication channel in accordance with an orthogonal frequency-division multiple access (OFDMA) communication technique. The OFDM signals may comprise a plurality of orthogonal subcarriers.

The S1 interface 115 is the interface that separates the RAN 100 and the core network 120. It is split into two parts: the S1-MME, which carries data traffic between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In cellular networks, LP cells are typically used to extend coverage to indoor areas where outdoor signals do not reach well, or to add network capacity in areas with very dense phone usage, such as train stations. As used herein, the term "low power (LP) eNB" refers to any suitable relatively low power eNB for implementing a narrower cell (narrower than a macro cell), such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a typical range of 30 to 50 meters for residential femtocells. Thus, an LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, an LP eNB may be implemented with a picocell eNB since it is coupled to a macro eNB via an X2 interface. Picocell eNBs or other LP eNBs may incorporate some or all functionality of a macro eNB. In some cases, an LP eNB may be referred to as an "access point base station" or "enterprise femtocell."

In some embodiments, a downlink resource grid may be used for downlink transmissions from an eNB 104 to a UE 102, while uplink transmissions from the UE 102 to the eNB 104 may utilize similar techniques. The grid may be a time-frequency grid, called a "resource grid" or "time-frequency resource grid," which is the physical resource in the downlink in each slot. Such a time-frequency plane representation is common for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a "resource element." Each resource grid comprises a number of resource blocks, which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical downlink control channel.

The physical downlink shared channel (PDSCH) carries user data and higher-layer signaling to a UE 102. The physical downlink control channel (PDCCH) or enhanced downlink control channel (EPDCCH) carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses control channel elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as resource element groups (REGs). Four quadrature phase-shift keying (QPSK) symbols are mapped to each REG. The PDCCH can be transmitted using one or more CCEs, depending on the size of downlink control information (DCI) and the channel condition. There may be four or more different PDCCH formats defined in LTE with different numbers of CCEs (e.g., aggregation level L=1, 2, 4, or 8).

Figure 2:
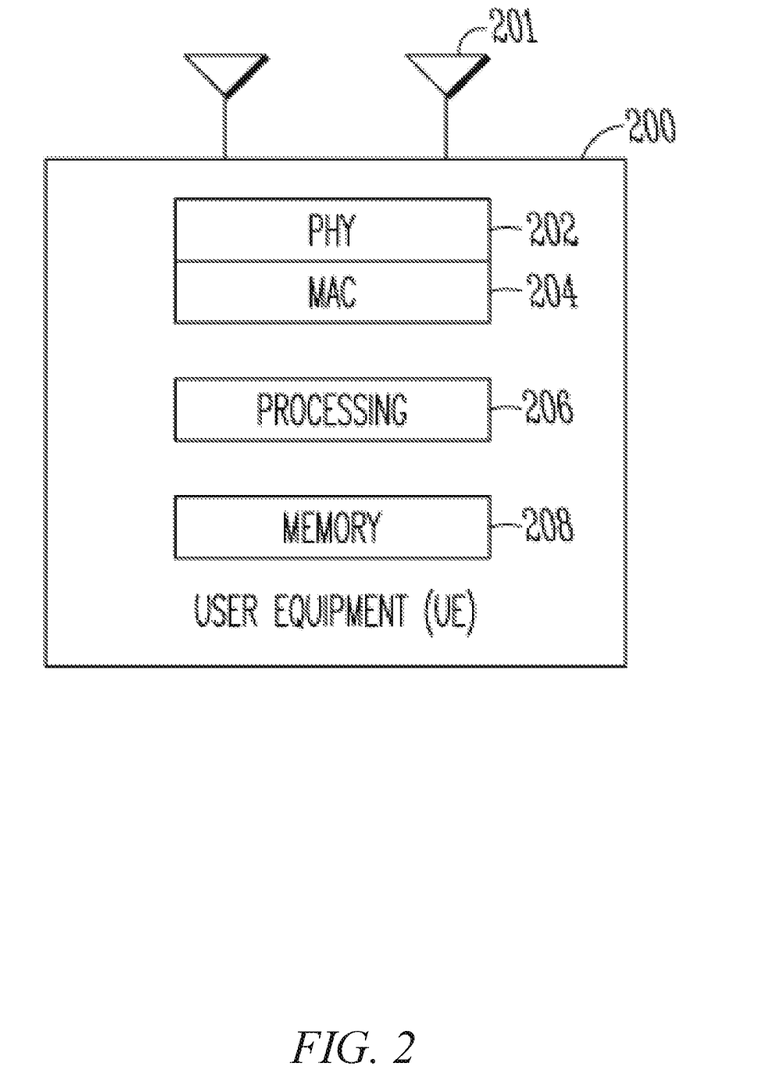
FIG. 2 is a functional diagram of a User Equipment (UE), in accordance with some embodiments.
Figure 3:
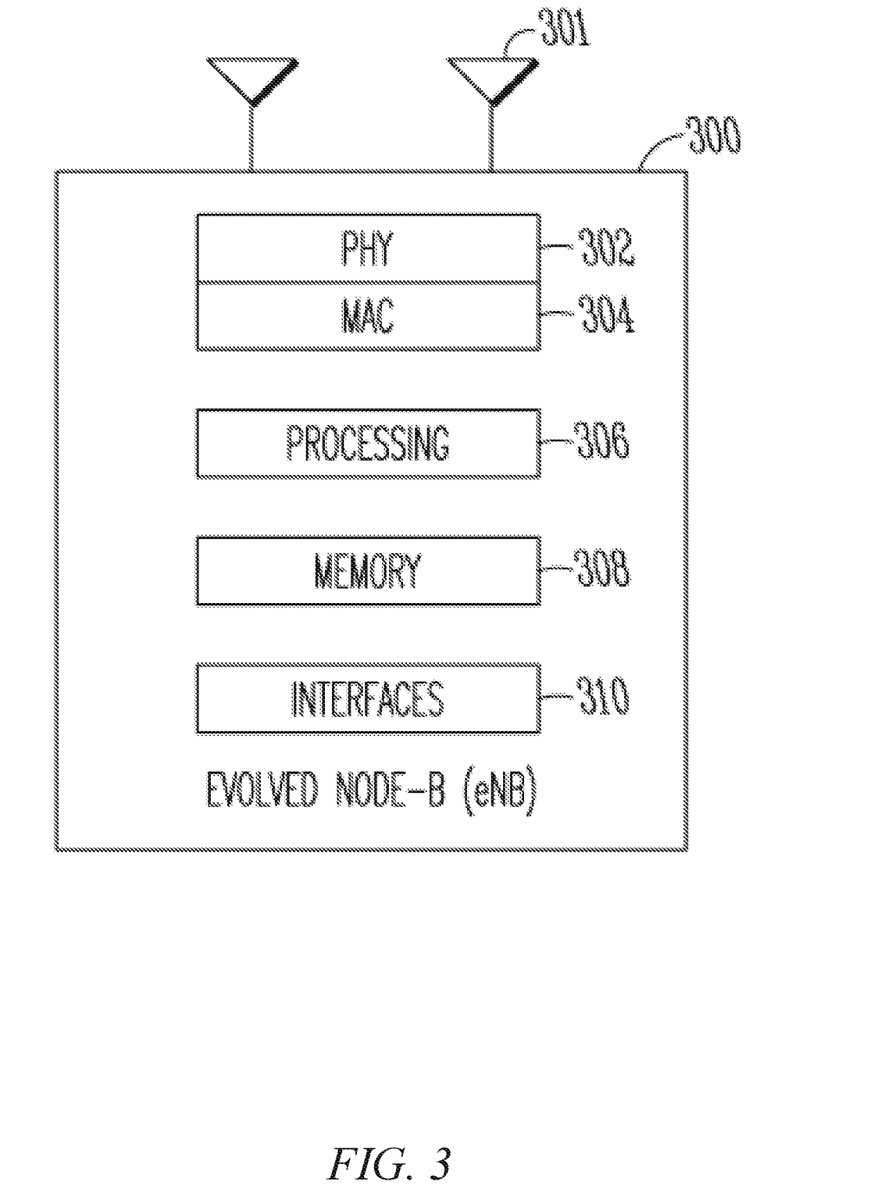
FIG. 3 is a functional diagram of an Evolved Node B (eNB), in accordance with some embodiments.

FIG. 2 is a functional diagram of a User Equipment (UE) 200, in accordance with some embodiments. FIG. 3 is a functional diagram of an Evolved Node B (eNB) 300, in accordance with some embodiments. It should be noted that in some embodiments, the eNB 300 can be a stationary non-mobile device. The UE 200 can be a UE 102 as depicted in FIG. 1, while the eNB 300 can be an eNB 104 as depicted in FIG. 1. The UE 200 can include physical layer circuitry (PHY) 202 for transmitting and receiving signals to and from the eNB 300, other eNBs, other UEs, or other devices, using one or more antennas 201. The eNB 300 can include physical layer circuitry (PHY) 302 for transmitting and receiving signals to and from the UE 200, other eNBs, other UEs, or other devices, using one or more antennas 301.

The UE 200 can also include medium access control layer (MAC) circuitry 204 for controlling access to the wireless medium, while the eNB 300 can also include medium access control layer (MAC) circuitry 304 for controlling access to the wireless medium.

The UE 200 can also include processing circuitry 206 and memory 208 arranged to perform the operations described herein, and the eNB 300 can also include processing circuitry 306 and memory 308 arranged to perform the operations described herein.

The eNB 300 can also include one or more interfaces 310, which can enable communication with other components, including other eNBs 104 (FIG. 1), components in the core network 120 (FIG. 1), or other network components. In addition, the interfaces 310 may enable communication with other components that may not be shown in FIG. 1, including components external to the network. The interfaces 310 may be wired, wireless, or a combination thereof.

The antennas 201, 301 may comprise one or more directional or omnidirectional antennas, including, for example, dipole antennas, monopole antennas, patch antennas, loop antennas, microstrip antennas, or other types of antennas suitable for transmission of radio frequency (RF) signals. In some multiple-input multiple-output (MIMO) embodiments, the antennas 201, 301 may be effectively separated to take advantage of spatial diversity and the different channel characteristics that may result.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device, including wearable devices that may receive and/or transmit information wirelessly. In some embodiments, the mobile device or other device can be a UE or an eNB configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

Although the UE 200 and the eNB 300 are each illustrated as having several separate functional elements, one or more of the functional elements can be combined and can be implemented by combinations of software-configured elements, such as processing elements including digital signal processors (DSPs), and/or other hardware elements. For example, some elements can comprise one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements can refer to one or more processes operating on one or more processing elements.

Embodiments can be implemented in one or a combination of hardware, firmware, and software. Embodiments can also be implemented as instructions stored on a computer-readable storage device, which can be read and executed by at least one processor to perform the operations described herein. A computer-readable storage device can include any non-transitory mechanism for storing information in a form readable by a machine (e.g., a computer). For example, a computer-readable storage device can include read-only memory (ROM), random-access memory (RAM), magnetic disk storage media, optical storage media, flash-memory devices, and other storage devices and media. Some embodiments can include one or more processors that can be configured with instructions stored on a computer-readable storage device.

In some embodiments, the UE 200 can be configured to receive OFDM communication signals over a multicarrier communication channel in accordance with an OFDMA communication technique. The OFDM signals can comprise a plurality of orthogonal subcarriers. In some broadband multicarrier embodiments, the eNB 300 can be part of a broadband wireless access (BWA) communication network, such as a Worldwide Interoperability for Microwave Access (WiMAX) communication network, a 3rd Generation Partnership Project (3GPP) Universal Terrestrial Radio Access Network (UTRAN) Long-Term-Evolution (LTE) network, or a Long-Term-Evolution (LTE) communication network, although the scope of this disclosure is not limited in this respect. In these broadband multicarrier embodiments, the UE 200 and the eNB 300 can be configured to communicate in accordance with an OFDMA technique.

Figure 4:
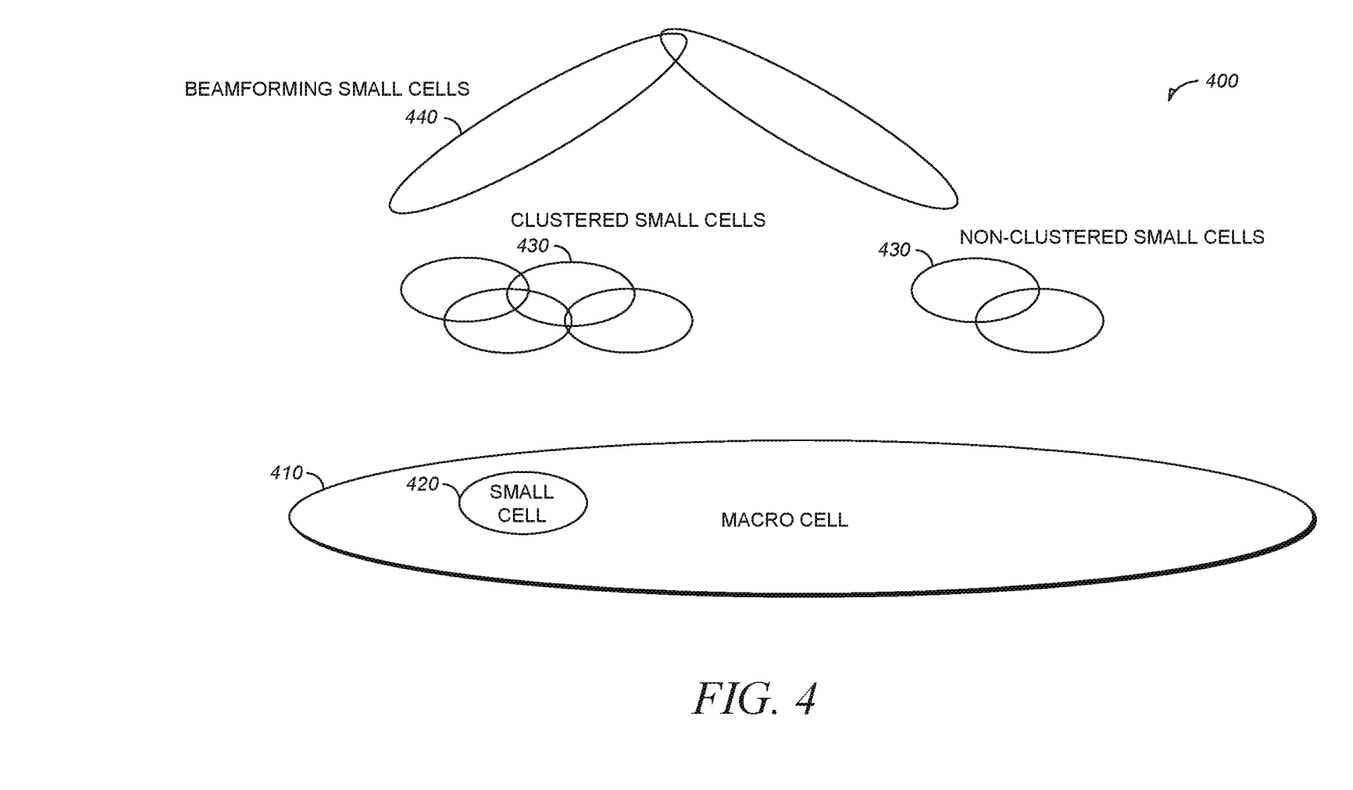
FIG. 4 illustrates an example of a heterogeneous network for a dual connectivity implementation, in accordance with some embodiments.

FIG. 4 illustrates an example of a heterogeneous network 400 for a dual connectivity implementation, according to some embodiments. FIG. 4 illustrates an example of different deployments that includes a large cell representing a macro cell 410. The heterogeneous network 400 can also include a small cell 420 (e.g., micro cell) in the same frequency as the macro layer, which includes the macro cell 410. Additionally, the heterogeneous network 400 can include small cells 430 deployed in clusters and small cells deployed in non-clusters (e.g., spread in a city) in a frequency layer different from that of the macro cell 410. Furthermore, the heterogeneous network 400 can include beamforming small cells 440 in a different radio access technology (RAT) which are deployed with beamforming ability.

Accordingly, in such a heterogeneous network 400, dual connectivity can allow the UE 102 to connect simultaneously to the macro cell 410 and the small cells 430 in a frequency layer different from the macro cell 410.

As previously mentioned, dual connectivity in an LTE network can significantly improve per-user throughput, reduce handovers, and reduce handover failures by allowing a user to be connected simultaneously to the macro cell 410 and small cells (e.g., small cell 420, small cell 430, and/or small cell 440).

Figure 5:
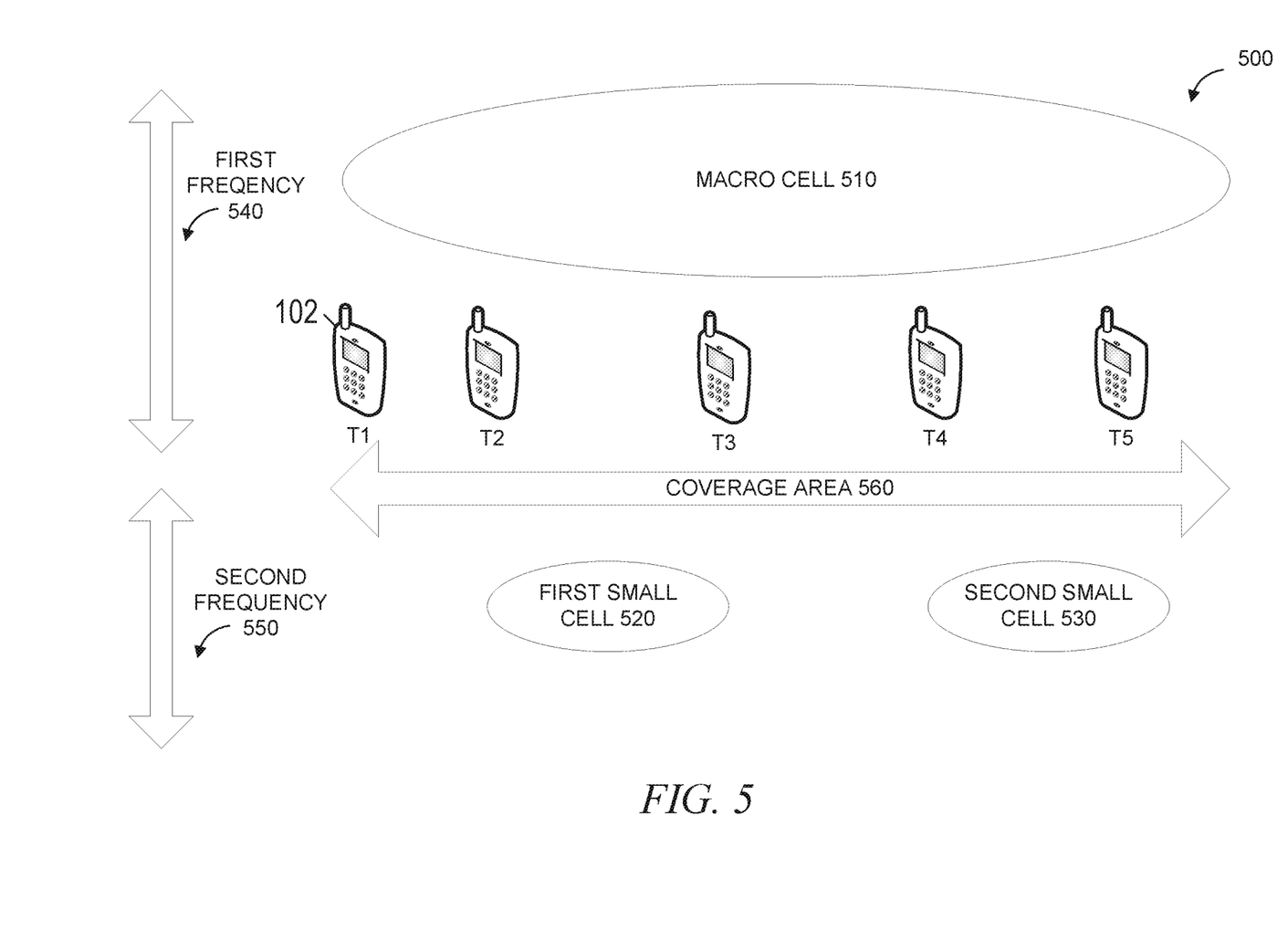
FIG. 5 illustrates an example scenario of dual connectivity implementation, in accordance with some embodiments.

FIG. 5 illustrates an example of a scenario 500 of a dual connectivity implementation, in accordance with some embodiments. In dual connectivity, the serving cells are operated in different eNBs. For example, the primary cell is served from a macro cell 510 and a secondary cell is served from a small cell (e.g., a first small cell 520, and/or a second small cell 530). In some instances, the small cell can be a pico cell or a femto cell. For example, the first small cell 520 is a first pico cell, and the second small cell 530 is a second pico cell.

As previously mentioned, one of the motivations of dual connectivity is to avoid frequent handovers in heterogeneous deployment, as illustrated in FIG. 4. As shown in the scenario 500, the UE 102 can move within a coverage area 560 of the macro cell 510. Since the coverage area (not pictured) of each of the small cells (e.g., coverage of first small cell 520 and second small cell 530) is smaller than that of the macro cell 510, the UE 102 may need to be handed over to the macro cell 510 or another small cell if the UE is connected to the small cell only. On the other hand, if the UE is connected to the macro cell 510, handover is not required, but offloading to the small cell is not provided. To achieve offloading and avoid the frequent handover, carrier aggregation can be performed.

With carrier aggregation, the UE can be served by both the macro cell 510 operating at a first frequency 540, and the small cell (e.g., first small cell 520, and/or second small cell 530) operating at a second frequency 550. For example, the primary cell can be the macro cell 510 and the secondary cell can be the small cell (e.g., first small cell 520, second small cell 530).

For example, at $T_1$, the UE 102, being within the coverage area (e.g., coverage area 560) of the macro cell 510, can be served by the macro cell 510 as the primary cell. Then at $T_2$, when the UE 102 is within the coverage area of the macro cell 510 and the first small cell 520, the first small cell 520 can be added as a secondary cell while the macro cell 510 is maintained as the primary cell. Additionally, at $T_3$, when the UE 102 is within the coverage area of the macro cell 510 but moves out of the coverage area of the first small cell 520, the first small cell 520 can be removed as the secondary cell while the macro cell 510 is maintained as the primary cell. Subsequently at $T_4$, when the UE 102 is within the coverage area of the macro cell 510 and the second small cell 530, the second small cell 530 can be added as a secondary cell while the macro cell 510 is maintained as the primary cell. Finally at $T_5$, when the UE 102 is within the coverage area of the macro cell 510 but moves out of the coverage area of the second small cell 530, the second small cell 530 can be removed as the secondary cell while the macro cell 510 is maintained as the primary cell.

In the example in FIG. 5, the primary cell (e.g., macro cell 510) can be responsible for mobility management, and therefore the UE 102 does not need to be handed over as long as the UE 102 is moving within the coverage area of the macro cell 510. Additionally, the secondary cell (e.g., first small cell 520, second small cell 530) can be used for data transmission, and the UE can take advantage of offloading to the secondary cell. The change from the first small cell 520 to second small cell 530 may be supported with secondary cell addition or removal, instead of handover.

In the scenario illustrated in FIG. 5, an example of a difference between dual connectivity and LTE Rel-10 carrier aggregation is illustrated. For example, in dual connectivity, the macro cell (e.g., macro cell 510) and the small cell (e.g., first small cell 520, second small cell 530) are served by different eNBs 104 and the two cells are connected through an X2 interface. In LTE Rel-10 carrier aggregation, it can be assumed that all serving cells are served by the same eNB 104.

Figure 6:
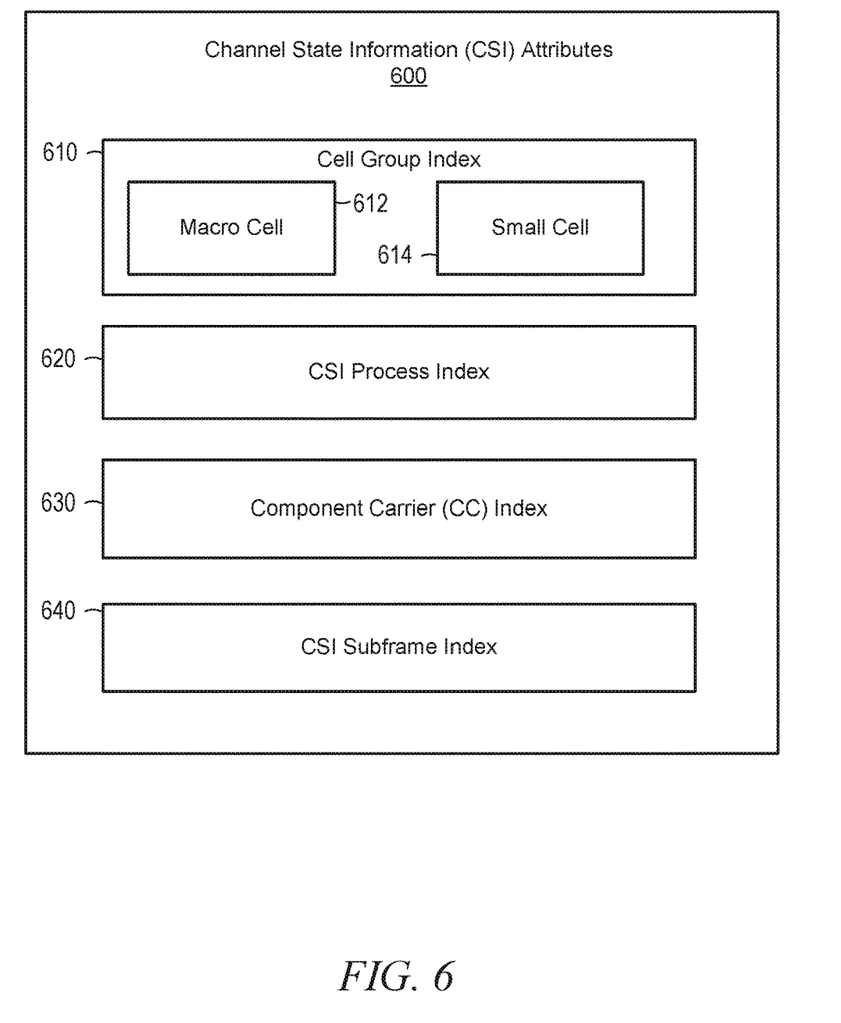
FIG. 6 illustrates an example of channel state information (CSI) attributes used for prioritizing CSI process calculations, in accordance with some embodiments.
Figure 7:
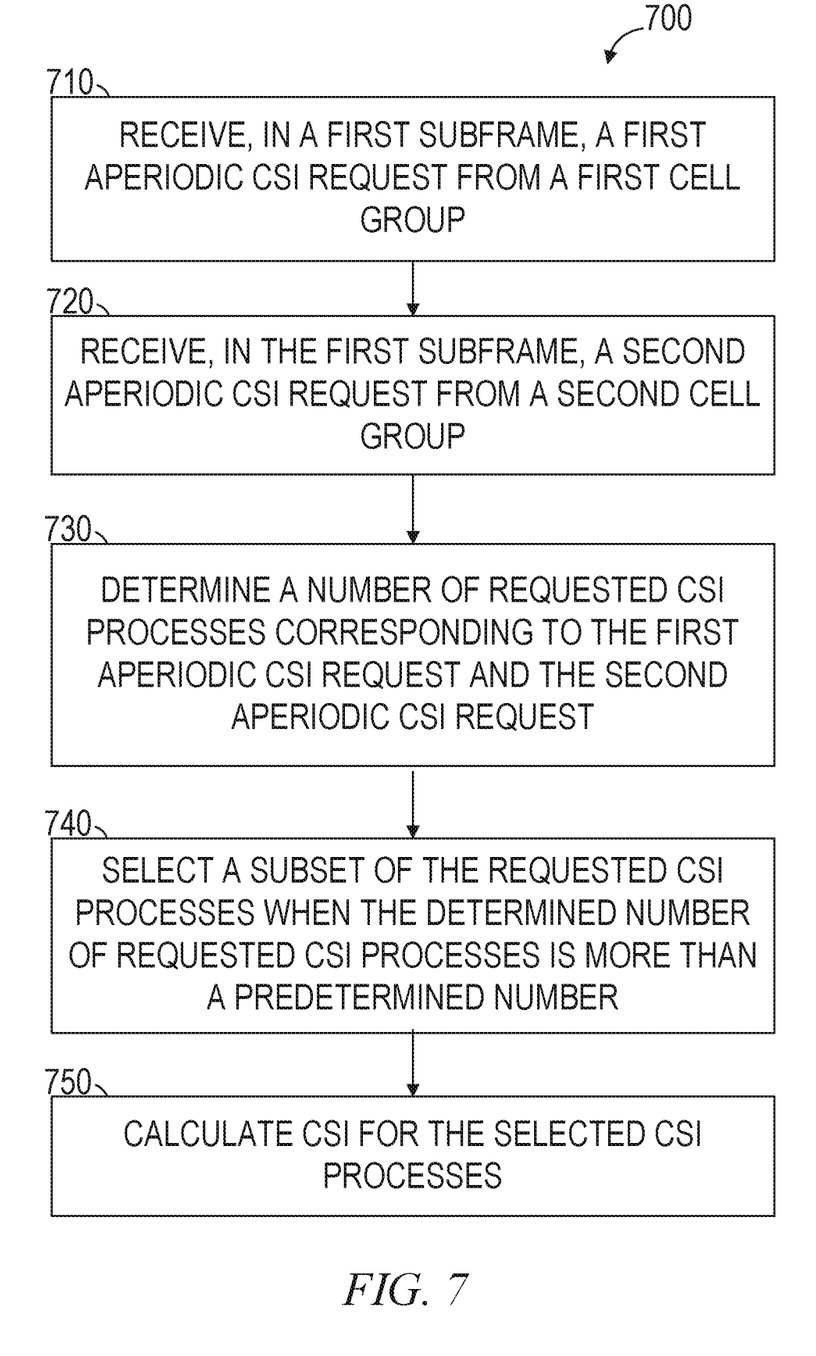
FIG. 7 illustrates the operation of a method performed by a UE for calculating prioritized CSI processes for a CSI report based on two CSI aperiodic requests received in the same subframe.
Figure 8:
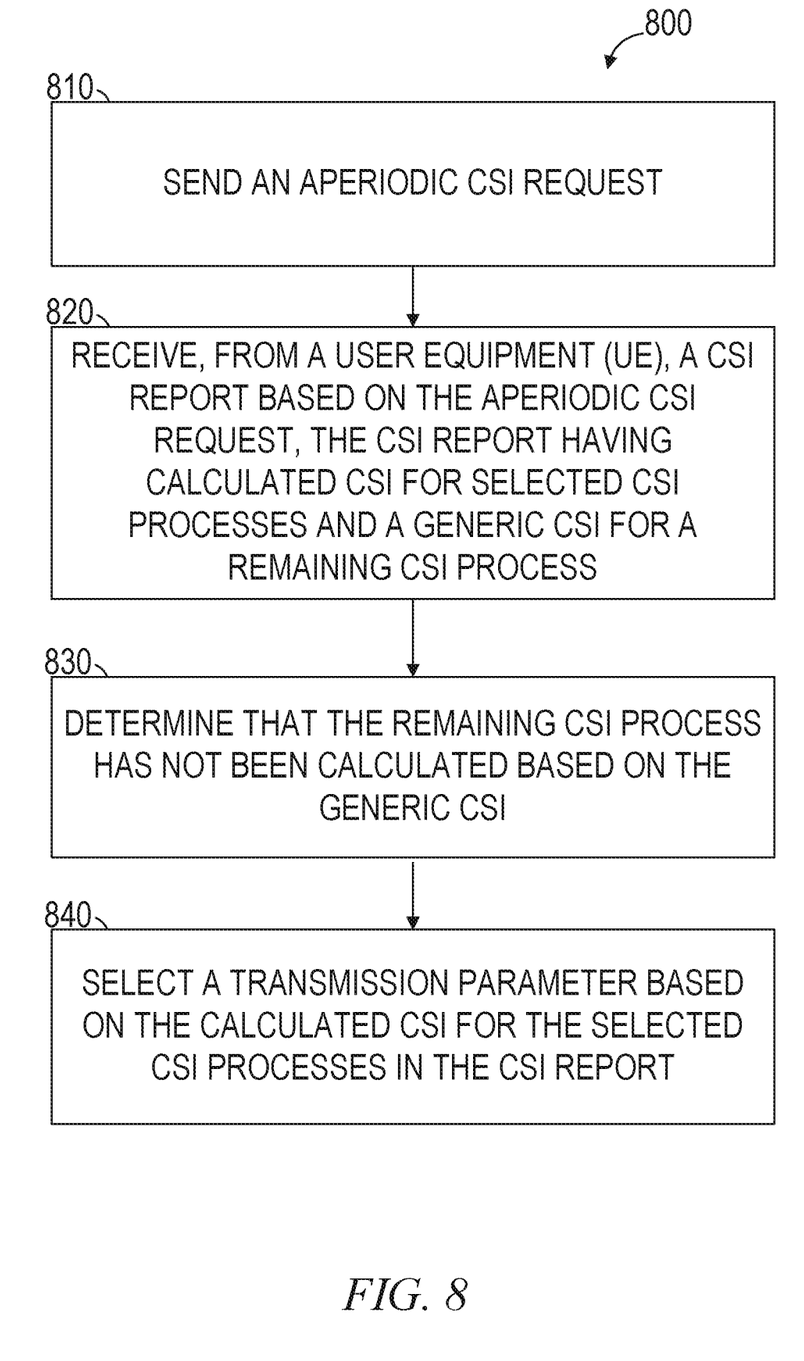
FIG. 8 illustrates the operation of a method performed by an eNB for selecting a transmission mode based on the CSI report received from the UE, in accordance with some embodiments.

Given that the macro cell (e.g., macro cell 510) and the small cell (e.g., first small cell 520, second small cell 530) are served by different eNBs 104, it is possible that the UE 102 receives more than one aperiodic CSI request in the same subframe from both the macro cell and the small cell. FIGS. 6-8 illustrate techniques for prioritizing and calculating CSI processes when multiple aperiodic CSI requests are received in the same subframe.

Additionally, in some embodiments, LTE carrier aggregation can be deployed on top of dual connectivity. For example, the macro and/or pico eNB 104 may aggregate multiple component carriers (or cells) in downlink and/or uplink channels.

Channel State Information (CSI) Reporting

LTE-Advanced (LTE-A) can support two types of CSI reporting, which are periodic and aperiodic reporting. Periodic CSI reporting may be mainly used to indicate the channel quality of the downlink channel at the UE 102 on a long-term basis. Periodic CSI can be provided by the UE 102 in accordance with a predefined reporting time schedule configured by the serving cell using higher-layer signaling (e.g. Radio Resource Control (RRC)) and usually has low overhead.

In contrast, aperiodic CSI reporting can be used to provide larger and more detailed reporting in a single reporting instance based on a dynamic CSI request triggered by the serving cell using a CSI request filed in the downlink control information (DCI). The DCI can include a Physical Downlink Control Channel (PDCCH) or an enhanced Physical Downlink Control Channel (EPDCCH).

In transmission mode 10, multiple CSI reports corresponding to multiple CSI processes on the same serving frequency can be requested by the eNB 104 in accordance with the Table 7.2.1-1B defined in TS 36.213 Rel-11 (reproduced below). The set of CSI processes for reporting corresponding to CSI request fields "01", "10", and "11" are configured using RRC signaling.

TABLE 7.2.1-1B

| CSI Request field for PDCCH/EPDCCH with uplink DCI format in UE specific search space | |
|---|---|
| Value of CSI request field | Description |
| '00' | No aperiodic CSI report is triggered |
| '01' | Aperiodic CSI report is triggered for a set of CSI process(es) configured by higher layers for serving cell C |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

In carrier aggregation mode, multiple CSI reports corresponding to multiple downlink cells can be requested by the eNB 104 in accordance with the Table 7.2.1-1A defined in TS 36.213 Rel-10 (reproduced below). The set of serving cells for reporting corresponding to CSI request fields "10" and "11" are configured using RRC signaling.

TABLE 7.2.1-1A

| CSI Request field for PDCCH/EPDCCH with uplink DCI format in UE specific search space | |
|---|---|
| Value of CSI request field | Description |
| '00' | No aperiodic CSI report is triggered |
| '01' | Aperiodic CSI report is triggered for serving cell C |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

Given that the UE 102 is not expected to receive more than one CSI request in one downlink subframe as defined in Section 7.2.1 of TS 36.211, the maximum number of CSI reports generated by the UE 102 in one subframe can be limited to five.

In the case of carrier aggregation, the maximum number of CSI requests is five due to an ideal backhaul link and a limit of one CSI request per downlink subframe. As previously mentioned, In LTE Rel-10 carrier aggregation, it can be assumed that all serving cells are served by the same eNB 104.

However, with dual connectivity, the macro cell (e.g., macro cell 510) and the small cell (e.g., first small cell 520, second small cell 530) are served by different eNBs 104 and two cells are connected through an X2 interface. Therefore, it can be possible for more than one CSI request to be sent in one downlink subframe. Additionally, with regards to dual connectivity, which can have a non-ideal backhaul link with high and variable delays, it can be difficult to ensure that only one CSI request is sent in each downlink subframe.

Furthermore, due to the CSI computational complexity, it is desirable to keep CSI calculation at the UE 102 at a reasonable level. Therefore, in some instance, a predetermined number of CSI reports to be calculated by the UE 102 can be set. For example, the predetermined number of CSI reports can be set to five, which is the existing constraint on the maximum number of CSI reports. In this disclosure, several embodiments are set forth that limit the number of CSI processes to be computed and reported in any subframe to five. For example, the CSI processes are prioritized and the top five CSI processes are calculated by the UE 102.

According to some embodiments, various aperiodic CSI reporting processes disclosed herein enable a reduction in CSI computational complexity at the UE 102 when dual connectivity is used.

FIG. 6 illustrates an example of CSI attributes 600, in accordance with some embodiments. For example, when more than five CSI processes are requested during the same subframe, the CSI attributes 600 can be used to select (e.g., prioritize) the top five CSI processes for the UE 102 to calculate. The CSI attributes can include, but are not limited to, a cell group index 610, a CSI process index 620, a component carrier (CC) index 630, and a CSI subframe index 640. The cell group index 610 can include an index value corresponding to a macro cell 612 and an index value corresponding to a small cell 614.

In a first set of embodiments, when simultaneous aperiodic CSI requests are received by the UE 102 from a primary eNB and a secondary eNB, the CSI (e.g., CSI process) computational priorities may be defined based on predetermined rules.

For example, For N total CSI processes requested in a given subframe, with N>5, the UE 102 may update a predetermined number (e.g., five) of top priority CSI processes. Additionally, the remaining (e.g., N−5 when the predetermined number is five) lower-priority CSI processes may not be updated. In some instances, a default value can be used for the remaining (e.g., non-updated) CSI processes. Alternatively, a previously calculated value can be used for the remaining CSI processes.

The CSI process priority list can be defined based on the CSI attributes 600, such as the cell group index 610 (e.g., Type of eNB), the CSI process index 620, the CC index 630, and the CSI subframe index 640.

Examples of possible ordering of the priorities (starting with the higher priority) can be defined as follows:

Cell group index 610>CSI process index 620>CC index 630>CSI subframe index 640;

CSI process index 620>Cell group index 610>CC index 630>CSI subframe index 640;

CSI process index 620>CC index 630>Cell group index 610>CSI subframe index 640

CSI process index 620>CC index 630>CSI subframe index 640>Cell group index 610

In one example, a lower cell group index 610 value (e.g., index value corresponding to a small cell 614) can have a higher priority for CSI computation than a higher cell group index 610 value (e.g., index value corresponding to a macro cell 612). Alternatively, in another example, a lower cell group index 610 value can have a lower priority for CSI computation than a higher cell group index 610 value. In some embodiments, the macro cell 612 may be included in a cluster of macro cells that operates in a different frequency band than the small cell 614 or another macro cell.

In some instances, all CSI requests for CSI processes may be reported, but not all of them may be updated. The non-updated CSI reports can be a previously reported CSI report based on previously received aperiodic CSI data or a default value. For example, the default values can be a channel quality indicator (CQI) with an index value of "0," which can correspond to an indication of the UE 102 being out of range. Additionally, a CQI with an index value of "0" can indicate that the UE 102 has not received any usable LTE signals. Furthermore, the aperiodic CSI configuration (i.e., the configuration of CSI request fields for different UEs 102) may be exchanged over an X2 interface between the primary eNB and the secondary eNB.

In a second set of embodiments, the sum of the maximum number of CSI processes configured for each CSI request field by the primary eNB and the secondary eNB may not exceed a predetermined number (e.g., five) of CSI processes.

In a third set of embodiments, different CSI subframes may be used by the primary eNB and the secondary eNB for aperiodic CSI triggering. The subframes used for triggering by the primary eNB may not be used for aperiodic CSI triggering by the secondary eNB. The subframes can be coordinated between the primary eNB and the secondary eNB using bitmap signaling, which for the frequency division duplexing (FDD) case, may have a length of 40 bits.

FIG. 7 illustrates the operation of a method 700 for calculating CSI for selected CSI processes, in accordance with some embodiments. As illustrated in FIGS. 5 and 6, multiple CSI requests can be received in the same subframe, which can result in more than five requested CSI processes needing to be calculated by the UE 102. In such cases, a selected subset of requested CSI processes are calculated based on the CSI attributes 600. Embodiments are not limited to these configurations, however, and some or all of the techniques and operations described herein may be applied to systems or networks that exclusively use macro cells or micro cells.

It is important to note that embodiments of the method 700 may include additional or even fewer operations or processes in comparison to what is illustrated in FIG. 7. In addition, embodiments of the method 700 are not necessarily limited to the chronological order that is shown in FIG. 7. In describing the method 700, reference may be made to FIGS. 1-6, although it is understood that the method 700 may be practiced with any other suitable systems, interfaces, and components. For example, reference may be made to the scenario 500 in FIG. 5 (described earlier) for illustrative purposes, but the techniques and operations of the method 700 are not so limited.

In addition, while the method 700 and other methods described herein may refer to eNBs 104 or UEs 102 operating in accordance with 3GPP or other standards, embodiments of those methods are not limited to just those eNBs 104 or UEs 102 and may also be practiced by other mobile devices, such as a Wi-Fi access point (AP) or user station (STA). Moreover, the method 700 and other methods described herein may be practiced by wireless devices configured to operate in other suitable types of wireless communication systems, including systems configured to operate according to various IEEE standards such as IEEE 802.11.

At operation 710 of the method 700, the UE 102 receives, in a first subframe, a first aperiodic CSI request from a first cell group. The physical layer circuitry 202 (in FIG. 2) can receive the first aperiodic CSI request from an eNB (e.g., eNB 104). The first cell group can be served by a primary eNB. The first cell group can include the macro cell 510.

As described in Table 7.2.1-1B above, the request field value for the first aperiodic CSI request can be "01", "10", or "11" in the transmission mode 10.

As described in Table 7.2.1-1A above, the request field value for the first aperiodic CSI request can be "10", or "11" in the carrier aggregation mode.

Dual connectivity in an LTE network allows the UE 102 to be connected simultaneously to a primary cell group and a secondary cell group via a primary eNB and a secondary eNB. As a result, in some instances, the UE 102 can receive more than one aperiodic CSI request in the same subframe. For example, the UE 102 can receive a CSI request from the primary eNB at operation 710 and another CSI request from the secondary eNB in the same subframe at operation 720.

At operation 720, the UE 102 receives, in the first subframe, a second aperiodic CSI request from a second cell group. The physical layer circuitry 202 can receive the second aperiodic CSI request from another eNB 104. The second cell group can be served by a secondary eNB. The second cell group can include the first small cell 520 or the second small cell 530. Additionally, the second cell group can operate at a different frequency than the first cell group.

As described in Table 7.2.1-1B above, the request field value for the second aperiodic CSI request can be "01", "10", or "11" in the transmission mode 10.

As described in Table 7.2.1-1A above, the request field value for the second aperiodic CSI request can be "10", or "11" in the carrier aggregation mode.

In some instances, the first aperiodic CSI request and the second aperiodic CSI request are received in the first subframe when the first aperiodic CSI request is received within 33 microseconds of the second aperiodic CSI request.

In one example, the first cell group includes a macro eNB and the second cell group includes a small cell eNB. In another example, the first cell group includes a small cell eNB and the second cell group includes a macro eNB. In yet another example, the first cell group and the second cell group can include different macro eNBs operating at different frequencies. In yet another example, the first cell group and the second cell group can include different small cell eNBs operating at different frequencies.

At operation 730, the UE 102 determines a number of requested CSI processes corresponding to the first aperiodic CSI request and the second aperiodic CSI request. In some instances, the processing circuitry 206 (in FIG. 2) determines the number of requested CSI processes. The number of requested CSI processes can be determining by adding the number of CSI processes associated with the first aperiodic CSI request and the number of CSI processes associated with the second aperiodic CSI request. As previously mentioned, due to the CSI computational complexity, the number of CSI processes to be computed and reported in any subframe may be limited to predetermined number (e.g., five) of CSI processes.

At operation 740, the UE 102 selects a subset of the requested CSI processes when the determined number of requested CSI processes is more than a predetermined number (e.g., five). For example, the UE 102 can select a subset of the requested CSI processes when there are more than five requested CSI processes. In some instances, the processing circuitry 206 selects the subset of CSI processes for updating (e.g., calculating). The number of requested CSI processes is determined at operation 730.

In some instances, the selected CSI processes comprise a total of five CSI processes. For example, the CSI processes are prioritized and the top five CSI processes are selected by the UE 102.

In some instances, the selected CSI processes comprise at least one fewer CSI process than the requested CSI processes. For example, when the number of requested CSI processes is seven, the number of selected CSI processes is 6 or less.

In some instances, the processing circuitry 206 is further configured to generate a priority list of the requested CSI processes based on CSI attributes. Additionally, the selecting of the subset of the requested CSI processes at operation 740 can be based on the priority list. The CSI attributes can include the CSI attributes 600 of FIG. 6. The CSI attributes 600 include the cell group index 610, the CSI process index 620, the CC index 630, and the CSI subframe index 640.

The priority list can be preset by a UE (e.g., UE 102) or an eNB (e.g., eNB 104). In some instances, the CSI process index 620 can have a higher priority in the priority list than the CC index 630. In some instances, the CC index 630 can have a higher priority in the priority list than the CSI subframe index 640.

In some instances, a lower cell group index 610 may have a higher priority in the priority list than a higher cell group index 610. Alternatively, the lower cell group index 610 may have a lower priority in the priority list than the higher cell group index 610. The lower cell group index 610 can correspond to a small cell eNB or secondary eNB. The higher cell group index 610 can correspond to a macro eNB or primary eNB.

At operation 750, the UE 102 calculates CSI for the selected CSI processes from operation 740. The processing circuitry 206 can calculate the CSI for each selected CSI process. As previously mentioned, a total of five CSI processes can be selected at operation 740, and therefore CSI for five processes can be calculated at operation 750.

The calculated CSI can include a precoding matrix indicator value. As described in method 800, a transmission parameter that is set or transmitted by a eNB 104 can include a precoding weight for transmitting antennas of eNB that is based on the precoding matrix indicator value.

Additionally, the calculated CSI can include a Rank Indicator (RI) value. The number of layers determined by the eNB 104 in method 800 is based on the RI value.

Furthermore, the calculated CSI can include a Channel Quality Indicator (CQI) value. A modulation and coding scheme (MCS) determined by the eNB 104 in method 800 can be based on the CQI value.

In some instances, the method 700 can further include generating a first CSI report and a second CSI report. For example, the CSI reports can be generated using the processing circuitry 206. The first CSI report can include the calculated CSI, from operation 750, corresponding to the first aperiodic CSI request. The second CSI report can include the calculated CSI, from operation 750, corresponding to the second aperiodic CSI request.

Additionally, the method 700 can further include transmitting the first CSI report to the first cell group, and the second CSI report to the second cell group. As previously mentioned, the first cell group sent the first aperiodic CSI request at operation 710, and the second cell group sent the second aperiodic CSI request at operation 720. For example, the physical layer circuitry 202 can transmit the first CSI report to the first cell group, and transmit the second CSI report to the second cell group.

Furthermore, all of the requested CSI processes from the first and second aperiodic requests are included in the first CSI report or second CSI report, but CSI is only calculated for the CSI processes selected at operation 740.

In some instances, the processing circuitry 206 is further configured to access previously stored CSI for a remaining process, the remaining process being different from the CSI processes selected at operation 740. Additionally, the first CSI report or the second CSI report can include the accessed CSI for the remaining process. For example, a remaining CSI process is a CSI process that is not updated (e.g., calculated) at operation 750. The processing circuitry 206 can access the value of the remaining CSI process stored in the memory 208. The value can correspond to previously calculated CSI associated with the remaining CSI process.

In some instances, the processing circuitry 206 is further configured to generate generic CSI for the remaining process. As previously mentioned, the remaining process is different from the CSI processes selected at operation 740. Additionally, the generic CSI indicates that the remaining process has not been calculated. Furthermore, the first CSI report or the second CSI report can include the generic CSI for the remaining process. For example, the portion of the first CSI report associated with the remaining process includes a Channel Quality Indicator (CQI) value that is set to zero to indicate that the CQI has not been calculated.

In some instances, the processing circuitry 206 is further configured to generate a CSI report based on the calculated CSI for the selected processes. Additionally, the physical layer circuitry 202 is further configured to transmit the CSI report to the first cell group and the second cell group.

FIG. 8 illustrates the operation of a method 800 for selecting a transmission mode based on the calculated CSI, in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In describing the method 800, reference may be made to FIGS. 1-7, although it is understood that the method 800 may be practiced with any other suitable systems, interfaces, and components.

In addition, while the method 800 and other methods described herein may refer to eNBs 104 or UEs 102 operating in accordance with 3GPP or other standards, embodiments of those methods are not limited to just those eNBs 104 or UEs 102 and may also be practiced by other mobile devices, such as a Wi-Fi access point (AP) or user station (STA). Moreover, the method 800 and other methods described herein may be practiced by wireless devices configured to operate in other suitable types of wireless communication systems, including systems configured to operate according to various IEEE standards such as IEEE 802.11.

The method 800 can be performed by an eNB 104 for selecting a transmission mode for a UE (e.g., UE 102) having dual connectivity in heterogeneous network.

At operation 810, the eNB 104 can send an aperiodic CSI request to a UE 102. In some instances, the physical layer circuitry 302 can send the CSI request.

In some instances, different CSI subframes may be used by the primary eNB and the secondary eNB for aperiodic CSI triggering. The subframes used for aperiodic CSI triggering by the primary eNB may not be used for aperiodic CSI triggering by the secondary eNB. The subframes can be coordinated between the primary eNB and the secondary eNB using bitmap signaling, which for the frequency division duplexing (FDD) case, may have a length of 40 bits. Additionally, each bit can correspond to a downlink subframe, where a "1" indicates that triggering may be used and a "0" indicates that triggering may not be used.

At operation 820, the PHY 302 of the eNB 104 can receive a CSI report based on the aperiodic request sent at operation 810. The CSI report can be generated and sent by the UE 102 using the method 700 in FIG. 7. In some instances, the physical layer circuitry 302 of the eNB 300 can receive the CSI report.

The CSI report can include CSI for selected CSI processes calculated at operation 750. Additionally, the CSI processes can be selected by the UE 102 at operation 740. Furthermore, the CSI report can include generic CSI for a remaining process. The remaining process can be a CSI process not selected at operation 740, but requested in the aperiodic CSI request sent at operation 810.

At operation 830, the eNB 104 can determine that the remaining CSI process has not been calculated based on the generic CSI. In some instances, operation 830 can be performed by the processing circuitry 306 of the eNB 300.

At operation 840, the processing circuitry 306 of the eNB 104 can select a transmission parameter based on the calculated CSI for the selected CSI processes in the CSI report. In some instances, operation 840 can be performed by the processing circuitry 306 of the eNB 300.

The transmission parameter(s) may be received at the UE 102. The transmission parameters may be set or transmitted by one of the eNBs 104, such as the eNB 104 of the serving cell. Accordingly, the decision of the eNB 104 to indicate the transmission mode may be based at least partly on information included in the CSI report previously described.

In some instances, the transmission parameters include a precoding weight for transmitting antennas of eNB that is based on a precoding matrix indicator value in the calculated CSI for one of the selected CSI processes.

In some instances, the transmission parameters include a number of layers that is based on the Rank Indicator (RI) value in the calculated CSI for one of the selected CSI processes.

In some instances, the transmission parameters include a modulation and coding scheme (MCS) that is based on a Channel Quality Indicator (CQI) value in the calculated CSI for one of the selected CSI processes.

A non-transitory computer-readable storage medium that stores instructions for execution by one or more processors to perform operations for reporting channel state information (CSI) in a cellular network is also disclosed herein. The operations may configure a UE to receive, in a first subframe, a first aperiodic CSI request from a first cell group; receive, in the first subframe, a second aperiodic CSI request from a second cell group; determine a number of requested CSI processes corresponding to the first aperiodic CSI request and the second aperiodic CSI request; select a subset of the requested CSI processes when the determined number of requested CSI processes is more than five; calculate CSI for the selected CSI processes; generate a CSI report based on the calculated CSI for the selected CSI processes; and transmit the CSI report to the first cell group and the second cell group.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for use in a user equipment (UE), the apparatus comprising:
processing circuitry; wherein to configure the UE for reporting channel state information (CSI), the processing circuitry is to:
decode radio resource control (RRC) signaling from a master cell group (MCG) associated with a master enhanced node-B (MeNB), the RRC signaling including configuration information to configure the UE for dual connectivity with the MeNB and a secondary eNB (SeNB) in a secondary cell group (SCG);
decode a physical downlink control channel (PDCCH) received by the UE, the PDCCH including a subframe with a plurality of aperiodic CSI report requests for both the MCG and the SCG, the plurality of aperiodic CSI report requests associated with a corresponding plurality of CSI processes at the UE;
select a subset of the plurality of CSI processes based on a number of CSI reports triggered by the plurality of aperiodic CSI report requests;
update CSI for the selected subset of the plurality of CSI processes; and
encode a physical uplink shared channel (PUSCH) for transmission to the MCG and the SCG, the PUSCH encoded to include a CSI report with the updated CSI for the selected subset of the plurality of CSI processes; and
memory coupled to the processing circuitry and configured to store the configuration information.

2. The apparatus of claim 1, wherein the processing circuitry is to:
decode the PDCCH to obtain a plurality of CSI attributes associated with the plurality of CSI processes.

3. The apparatus of claim 2, wherein the plurality of CST attributes includes:
a cell group index associated with the MCG or the SCG;
a CST process index indicating a CST process of the plurality of CST processes;
a component carrier (CC) index indicating a CC for transmitting the CST report; and
a CSI subframe index indicating a subframe for transmitting the CSI report.

4. The apparatus of claim 3, wherein the processing circuitry is to:
prioritize the plurality of CSI attributes according to a pre-defined prioritization rule, to obtain prioritized plurality of CSI attributes; and
select the subset of the plurality of CSI processes further based on the prioritized plurality of CST attributes.

5. The apparatus of claim 4, wherein the pre-defined prioritization rule is based on:
the cell group index having higher priority than the CSI process index;
the CST process index having higher priority than the CC index; and
the CC index having higher priority than the CSI subframe index.

6. The apparatus of claim 4, wherein the pre-defined prioritization rule is based on:
the CSI process index having higher priority than the cell group index;
the cell group index having higher priority than the CC index; and
the CC index having higher priority than the CSI subframe index.

7. The apparatus of claim 4, wherein the pre-defined prioritization rule is based on:
the CSI process index having higher priority than the CC index;
the CC index having higher priority than the cell group index; and
the cell group index having higher priority than the CST subframe index.

8. The apparatus of claim 1, wherein the processing circuitry is to:
when the number of CSI reports triggered by the plurality of aperiodic CSI report requests is smaller than or equal to a threshold number of CST reports:
update the CST for the subset of the plurality of CST processes corresponding to each of the triggered CST reports; and
access a previously-calculated CSI for a remaining process, the remaining process being different from the subset of the plurality of CSI processes.

9. The apparatus of claim 8, wherein the processing circuitry is to:
generate the CSI report to further include a CSI configuration associated with the remaining process.

10. The apparatus of claim 9, wherein the CST configuration includes information indicating whether a channel quality indicator (CQI) is calculated for the remaining process.

11. The apparatus of claim 8, wherein the processing circuitry is to:
when the number of CSI reports triggered by the plurality of aperiodic CSI report requests is greater than the threshold number of CST reports:
adjust the subset of the plurality of CSI processes to correspond the threshold number of CSI reports; and
update the CST for the adjusted subset of the plurality of CSI processes.

12. The apparatus of claim 11, wherein the UE is not required to update the CSI for more than the adjusted subset of the plurality of CSI processes.

13. The apparatus of claim 2, wherein the processing circuitry is further configured to:
perform first CSI reporting corresponding to a first aperiodic CST report request from the MCG in the plurality of aperiodic CSI report requests; and
perform second CST reporting corresponding to a second aperiodic CSI report request from the SCG in the plurality of aperiodic CSI report requests.

14. The apparatus of claim 13, wherein the processing circuitry is further configured to:
encode the PUSCH to include a first CSI report corresponding to the first CSI reporting for transmission to the MCG; and
encode the PUSCH to include a second CSI report corresponding to the second CSI reporting for transmission to the SCG.

15. The apparatus of claim 1, further comprising transceiver circuitry coupled to the processing circuitry; and, one or more antennas coupled to the transceiver circuitry.

16. A non-transitory computer-readable storage medium that stores instructions for execution by one or more processors of a user equipment (UE), wherein to configure the UE for reporting channel state information (CST), the instructions configure the one or more processors to:

decode radio resource control (RRC) signaling from a master cell group (MCG) associated with a master enhanced node-B (MeNB), the RRC signaling including configuration information to configure the UE for dual connectivity with the MeNB and a secondary eNB (SeNB) in a secondary cell group (SCG);

decode a physical downlink control channel (PDCCH) received by the UE, the PDCCH including a subframe with a plurality of aperiodic CSI report requests for both the MCG and the SCG, the plurality of aperiodic CSI report requests associated with a corresponding plurality of CSI processes at the UE;

select a subset of the plurality of CSI processes based on a number of CSI reports triggered by the plurality of aperiodic CSI report requests;

update CSI for the selected subset of the plurality of CST processes; and encode a physical uplink shared channel (PUSCH) for transmission to the MCG and the SCG, the PUSCH encoded to include a CSI report with the updated CSI for the selected subset of the plurality of CSI processes.

17. The non-transitory computer-readable storage medium of claim 16, wherein the instructions further cause the UE to:

decode the PDCCH to obtain a plurality of CSI attributes associated with the plurality of CSI processes.

18. The non-transitory computer-readable storage medium of claim 17, wherein the instructions further cause the UE to:

prioritize the plurality of CSI attributes according to a pre-defined prioritization rule, to obtain prioritized plurality of CSI attributes; and select the subset of the plurality of CSI processes further based on the prioritized plurality of CSI attributes.

19. An apparatus for use in a master enhanced Node-B (MeNB) in a master cell group (MCG), the apparatus comprising:

processing circuitry, wherein to configure the MeNB for aperiodic reporting of channel state information (CSI), the processing circuitry is configured to:

encode radio resource control (RRC) for transmission to a user equipment (UE), the RRC signaling including configuration information to configure the LE for dual connectivity with the MeNB and a secondary eNB (SeNB) in a secondary cell group (SCG);

encode a physical downlink control channel (PDCCH) for transmission to the UE; the PDCCH encoded to include a subframe with a plurality of aperiodic CSI report requests, the plurality of aperiodic CSI report requests associated with a corresponding plurality of CSI processes at the UE;

decode a physical uplink shared channel (PUSCH) received from the UE, the PUSCH including a CSI report with CSI for a subset of the plurality of CSI processes, the subset of the plurality of CSI processes based on a number of CSI reports triggered by the plurality of aperiodic CSI report requests, and the CSI report further including CSI for at least one remaining process of the plurality of CSI processes that is different from the subset of the plurality of CSI processes; and adjust physical layer (PHY) parameters or media access control layer (MAC) parameters based on the CSI report; and memory coupled to the processing circuitry and configured to store the CSI report.

20. The apparatus of claim 19, wherein the CSI report further includes a CSI configuration associated with the at least one remaining process, when the number of CSI reports triggered by the plurality of aperiodic CSI report requests is smaller than or equal to a threshold number of CSI reports; and wherein the CSI configuration includes information indicating whether a channel quality indicator (CQI) is calculated for the at least one remaining process.

* * * * *

UNITED STATES PATENT AND TRADEMARK OFFICE
CERTIFICATE OF CORRECTION

PATENT NO. : 11,166,331 B2
APPLICATION NO. : 16/692304
DATED : November 2, 2021
INVENTOR(S) : Davydov et al.

Page 1 of 2

It is certified that error appears in the above-identified patent and that said Letters Patent is hereby corrected as shown below:

In the Claims

In Column 15, Line 10, in Claim 1, delete "circuitry;" and insert --circuitry,-- therefor In Column 15, Line 42, in Claim 3, delete "CST" and insert --CSI-- therefor In Column 15, Line 45, in Claim 3, delete "CST" and insert --CSI-- therefor In Column 15, Line 45, in Claim 3, delete "CST" and insert --CSI-- therefor In Column 15, Line 46, in Claim 3, delete "CST" and insert --CSI-- therefor In Column 15, Line 48, in Claim 3, delete "CST" and insert --CSI-- therefor In Column 15, Line 57, in Claim 4, delete "CST" and insert --CSI-- therefor In Column 15, Line 63, in Claim 5, delete "CST" and insert --CSI-- therefor In Column 16, Line 13, in Claim 7, delete "CST" and insert --CSI-- therefor In Column 16, Line 19, in Claim 8, delete "CST" and insert --CSI-- therefor In Column 16, Line 20, in Claim 8, delete "CST" and insert --CSI-- therefor In Column 16, Line 20, in Claim 8, delete "CST" and insert --CSI-- therefor In Column 16, Line 21, in Claim 8, delete "CST" and insert --CSI-- therefor In Column 16, Line 30, in Claim 10, delete "CST" and insert --CSI-- therefor Signed and Sealed this
Fourth Day of January, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,166,331 B2

In Column 16, Line 38, in Claim 11, delete "CST" and insert --CSI-- therefor

In Column 16, Line 41, in Claim 11, delete "CST" and insert --CSI-- therefor

In Column 16, Line 49, in Claim 13, delete "CST" and insert --CSI-- therefor

In Column 16, Line 51, in Claim 13, delete "CST" and insert --CSI-- therefor

In Column 17, Line 1, in Claim 16, delete "(CST)," and insert --(CSI),-- therefor In Column 17, Line 18, in Claim 16, delete "CST" and insert --CSI-- therefor In Column 18, Line 6, in Claim 19, delete "LE" and insert --UE-- therefor In Column 18, Line 10, in Claim 19, delete "UE;" and insert --UE,-- therefor